June 16, 1959 — E. C. KIEKHAEFER — 2,890,845
OUTBOARD MOTOR CLAMP SCREW

Filed May 31, 1955 — 2 Sheets-Sheet 1

INVENTOR
ELMER C KIEKHAEFER
BY Steve W. Grenbaw
ATTORNEY

June 16, 1959  E. C. KIEKHAEFER  2,890,845
OUTBOARD MOTOR CLAMP SCREW

Filed May 31, 1955  2 Sheets-Sheet 2

INVENTOR
ELMER C. KIEKHAEFER
BY
ATTORNEY

United States Patent Office 2,890,845
Patented June 16, 1959

2,890,845

OUTBOARD MOTOR CLAMP SCREW

Elmer Carl Kiekhaefer, Cedarburg, Wis.

Application May 31, 1955, Serial No. 511,837

3 Claims. (Cl. 248—4)

This invention relates generally to outboard motors and more specifically to the clamp screws thereof adapted to be manually turned and tightened for securing the motor to the transom of a boat.

Heretofore, the clamp brackets of outboard motors have been provided with steel clamp screws for removably securing the motor to the boat transom. These clamp screws have presented problems arising out of the tendency of the clamp screws to rattle and loosen due to motor vibrations being transmitted thereto. The tendency of the clamp screws to loosen during operation of the motor places a burden upon the operator to constantly check the clamp screws at regular intervals and to tighten same to prevent loss of the outboard motor. The prior art clamp screws further were objectionable, particularly in salt water operation of the outboard motor, because of the tendency of the screws to rust and corrode causing same to be locked to the clamp bracket. Efforts to loosen the screws often resulted in breakage of the screws within the clamp bracket causing great inconvenience to the owner thereof and necessitating costly repair work.

A principal object of the present invention is to provide a clamp screw that will solve the problems referred to above and will avoid the objectionable features of prior clamp screw construction.

Another object of the invention is to provide a non-metallic clamp screw that is self-locking for eliminating the tendency of the clamp screw to loosen as a result of the vibration of the motor and boat transom.

Another object of the invention is the provision of a non-metallic clamp screw that is rust proof and resists any tendency to corrode.

Another object of the invention is to provide a clamp screw that requires fewer parts, less machining, and may be more economically produced than prior known clamp screws.

Another object of the invention is to provide a non-metallic clamp screw of a material such as nylon or the like having the property of initially deforming under pressure and tending to return to its original shape after the deforming pressure is removed without taking a permanent set.

Objects and advantages other than those set forth above will be apparent from the following description when read in connection with the accompanying drawing, in which.

Figure 5:
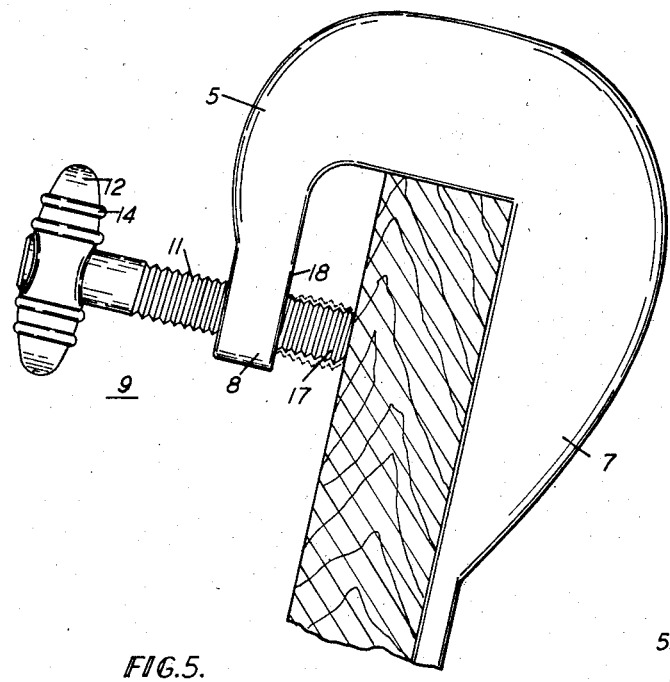
Fig. 5 is a side elevation view showing a clamp bracket of an outboard motor tightly secured to the transom by means of the clamp screw.
Figure 6:
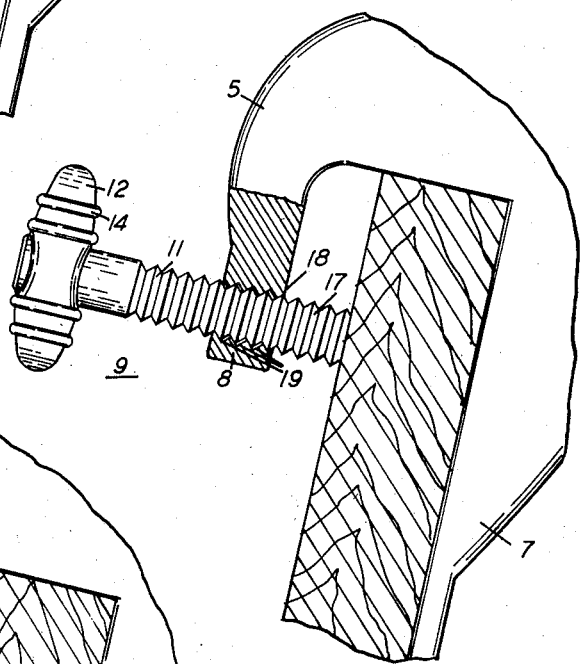
Figure 7:
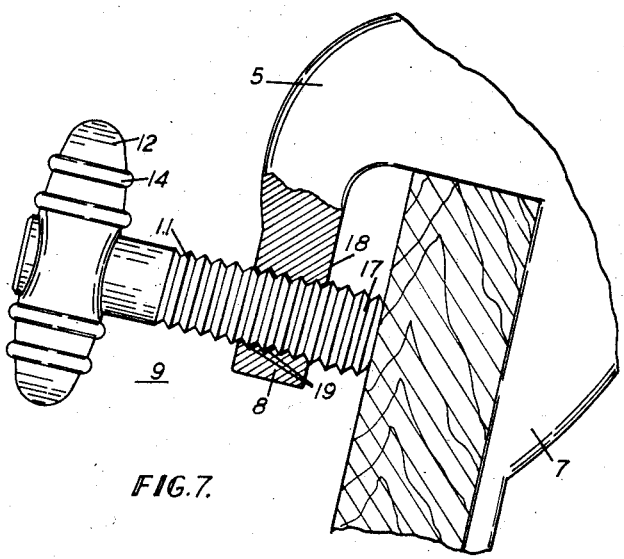

Fig. 6 is an enlarged segmental view of Fig. 5 shown partially in section showing the relative positions of a conventional steel screw and a threaded leg portion where the screw is tightened to exert pressure against the transom; and Fig. 7 is a segmental view similar to Fig. 6 showing the relative positions of a non-metallic screw of applicant's invention and a threaded bracket wherein the screw is tightened to exert pressure against the transom.

As shown in the drawings, a preferred embodiment of this invention is illustrated as applied to an outboard motor 1 having a clamp bracket 2 for securing and supporting the same upon the transom 3 of a boat, not shown.

The outboard motor 1 includes the power head 4 driving an underwater propeller 6 and producing a substantial vibration tending to loosen the clamp 2 upon the transom 3.

The clamp bracket 2 has a cast or forged metal body 5 of generally inverted U-shape to slip over the top of the transom 3. The rear leg 7 of the clamp body 5 presents a flat clamp surface adapted to engage the rear side of the boat transom 3. The forward legs 8 of the clamp body 5 each carry a clamp screw 9 which is adapted to engage the front side of the transom 3 to tighten the clamp 2 thereto.

Each clamp screw 9 is molded or formed of a non-metallic plastic material such as nylon which is capable of being deformed in the cold state without taking a permanent set and which tends to return to its original shape after the deforming pressure is removed. The clamp screw 9 forms a threaded shank 11 at one end and a hand grip 12 at the other end. The shank 11 is threaded through the leg 8 of the clamp body 5, and one end thereof forms a clamp head 13 adapted to engage the front side of the boat transom 3 to exert pressure thereon. The head 13 has a curved or convex face to facilitate tightening of the screw 9.

The hand grip 12 transmits the major rotational force of the operator's hand to the shank 11 to effect tightening and loosening of the clamp 2 and extends transverse to the shank 11 to provide a nice fit in an operator's hand for applying high clamping forces without injury to the hand. The threads on the shank 11 should be spaced from the hand grip a distance corresponding to the thickness of the fingers of a normal operator's hand to avoid encounter of the fingers with the threads when the grip 12 is tightly squeezed by the hand. The hand grip 12 may have a series of spaced circumferential ribs 14 thereon to prevent slippage of the operator's hand when gripping the same. In the illustration the ribs 14 are spaced a distance generally a little less than the width of a finger so that the fingers effect a greater grip thereon.

Figure 1:
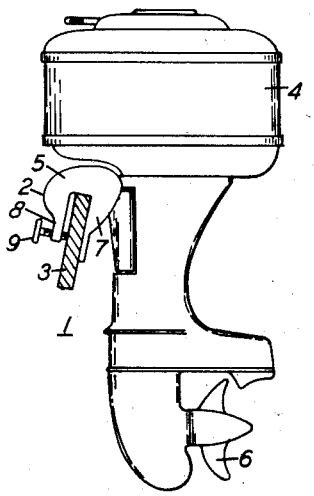
Fig. 1 is a side elevation view of an outboard motor in which the invention is embodied.
Figure 2:
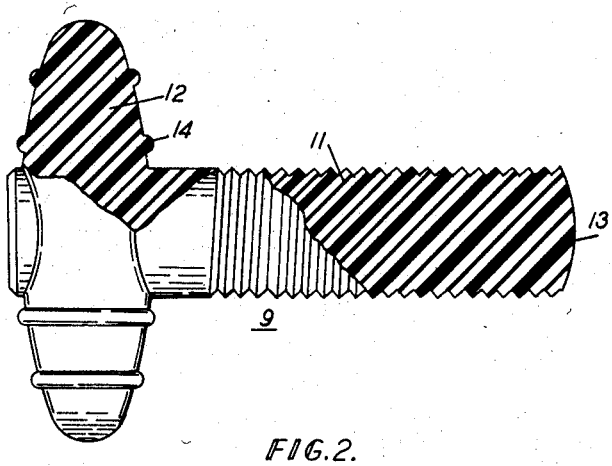
Fig. 2 is a side elevation view partially in section of a clamp screw in accordance with the teachings of applicant's invention.
Figure 3:
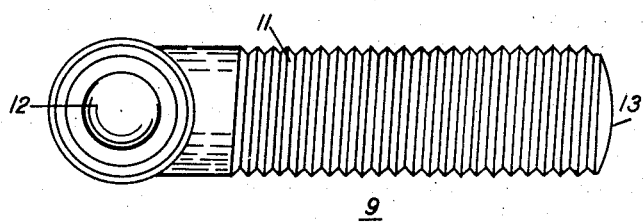
Fig. 3 is a plan elevation view of the clamp screw in Fig. 2.
Figure 4:
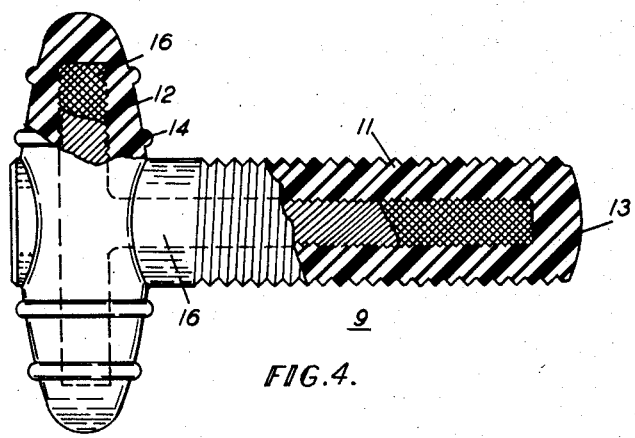
Fig. 4 is a side elevation view partially in section of a modification of the clamp screw embodying applicant's invention.

In the modification of the invention shown in Fig. 4, the clamp screw 9 for added rigidity and greater torsional strength is provided with a metal T-shaped core 16 to which the non-metallic material such as nylon is molded completely embedding the metal core 16 and forming the hand grip 12 and threaded shank 11. The metal core 16 is provided with an irregular shape or knurling to provide a strong mechanical bond between the core 16 and the non-metallic material.

In operation, the clamp bracket 2 of the outboard motor 1 is firmly secured to the transom 3 by turning the clamp screws 9 in a direction forcing the clamp head 13 into engagement with the front side of the transom 3. In the tightly clamped position as shown in Fig. 5, the plastic shank portion 17 between the inner side of the transom 3 and the forward leg 8 of the clamp body 5 is subjected to a high compressive force causing the shank portion 17 to bulge outwardly as exaggerated in dotted lines in Fig. 5. This radially outward movement of the shank portion 17 is possible because of the low modulus of elasticity of the plastic material. The expansion of the shank portion 17 radially is beneficial in that in attempting to regain its original shape it exerts a constant force axially against the transom 3 and the forward leg 8 tending to prevent the clamp bracket 2 from loosening on the transom 3. The expansion of the shank portion 17 further provides a locking means for the clamp screw 9 by causing the threads of the shank 11 in engagement with the threads of the inner edge 18 of the forward leg 8 to be forced by the radial expansion of the shank portion 17 into tight frictional engagement therewith as shown in Fig. 7. This may be contrasted with the conventional steel shank 11 and forward leg 8 in which one of the surfaces of the threads of the shank 11 is forced into frictional engagement with one of the surfaces of the mating threads in the leg 8 with a predetermined constant tolerance 19 between the remaining surfaces as shown in Fig. 6. The expansion of the steel shank portion 17 is negligible because of the high modulus of elasticity of the metal which is at least twenty to one hundred times as great as the modulus of elasticity of plastic.

Although only two embodiments of the invention have been illustrated and described, various changes and modifications of the invention may be made therein without departing from the spirit of the invention or from the scope of the appended claims.

It is claimed and desired to secure by Letters Patent:

1. An outboard motor including a screw clamp for removably securing said motor to the transom of a boat comprising: an inverted U-shaped metal clamp member having a predetermined modulus of elasticity mounted on said motor and adapted to fit over said transom, said clamp member having a rear leg engaging the rear side of said transom and a forward leg spaced from the front side of said transom, said forward leg having a threaded opening transverse to said transom; a screw shank of nylon threaded through said threaded opening and having a modulus of elasticity less than said predetermined modulus of elasticity; a cross member transversely mounted to one end of said shank to provide a hand grip for turning of the shank to move said shank axially toward said transom to secure said motor thereto against the vibration of said motor, said hand grip when turned in one direction causing the shank to be moved axially toward said transom with the other end of said shank engaging said transom in pressure increasing relation to cause the shank portion interposed between said front side of said transom and said forward leg of said clamp member to be expanded radially forcing the threads thereof into frictional engagement with the threads of said opening whereby said shank is locked thereto and prevented from loosening therein although subjected to continuous motor vibration.

2. An outboard motor including a screw clamp for removably securing said motor to the transom of a boat comprising: an inverted U-shaped metal clamp member having a predetermined modulus of elasticity mounted on said motor and adapted to fit over said transom, said clamp member having a rear leg engaging the rear side of said transom and a forward leg spaced from the front side of said transom, said forward leg having a threaded opening transverse to said transom; a substantially T-shaped metal core having a non-metallic plastic material molded thereon having a modulus of elasticity less than said predetermined modulus of elasticity; a screw shank formed by said plastic material threaded into said threaded opening; and a hand grip formed by said plastic material near one end of said shank and transverse thereto for turning of the shank to move said shank axially toward said transom to secure said motor thereto against the vibration of said motor, said shank having a convex face portion adapted to engage the transom to facilitate tightening said screw clamp, said hand grip when turned in one direction causing the shank to be moved axially toward said transom with said face portion of said shank engaging said transom in pressure increasing relation to cause the shank portion interposed between said front side of said transom and said forward leg of said clamp member to be expanded radially forcing the threads thereof into frictional engagement with the threads of said opening whereby said shank is locked thereto and prevented from loosening therein although subjected to continuous motor vibration.

3. An outboard motor including a screw clamp for removably securing said motor to the transom of a boat comprising an inverted U-shaped metal clamp member having a predetermined modulus of elasticity mounted on said motor and adapted to fit over said transom, said clamp member having a rear leg engaging the rear side of said transom and a forward leg spaced from the front side of said transom, said forward leg having a threaded opening transverse to said transom; a screw shank of plastic material threaded into said threaded opening and having a modulus of elasticity less than said predetermined modulus of elasticity; a cross member transversely mounted on one end of said shank to provide a hand grip for turning said shank to move said shank axially toward said transom to secure said motor thereto against the vibration of said motor, said hand grip when turned in one direction causing the shank to be moved axially toward said transom with the other end of said shank engaging said transom in pressure increasing relation to cause the shank portion interposed between said front side of said transom and said forward leg of said clamp member to be expanded radially forcing the threads thereof into frictional engagement with the threads of said opening whereby said shank is locked thereto and said clamp prevented from loosening on said transom although subjected to continuous motor vibration.

References Cited in the file of this patent

UNITED STATES PATENTS

| 2,432,986 | Forman | Dec. 23, 1947 |
| 2,510,693 | Green | June 6, 1950 |
| 2,592,698 | Hubbard | Apr. 15, 1952 |
| 2,603,080 | Earnhart | July 15, 1952 |

FOREIGN PATENTS

| 257,703 | Great Britain | Sept. 9, 1926 |

OTHER REFERENCES

Product Engineering, December 1946.